Oct. 17, 1961  H. F. HEINTZMANN  3,004,637
YIELDING CONNECTION FOR IDENTICAL FLANGED CHANNEL-LIKE
PROFILE MEMBERS IN OVERLAPPING ENGAGEMENT
Filed Feb. 27, 1957  3 Sheets-Sheet 1
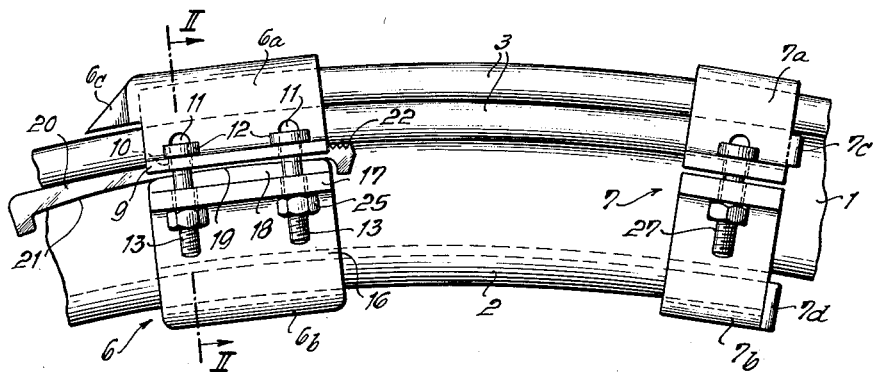
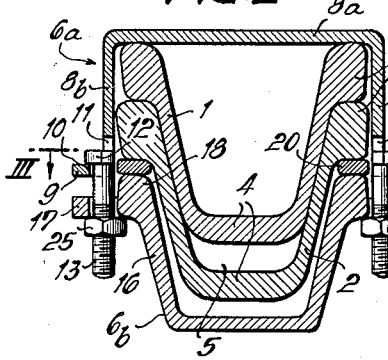
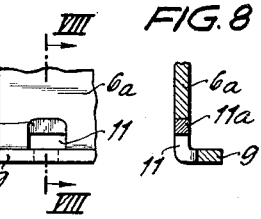
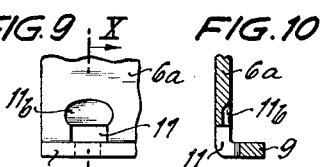
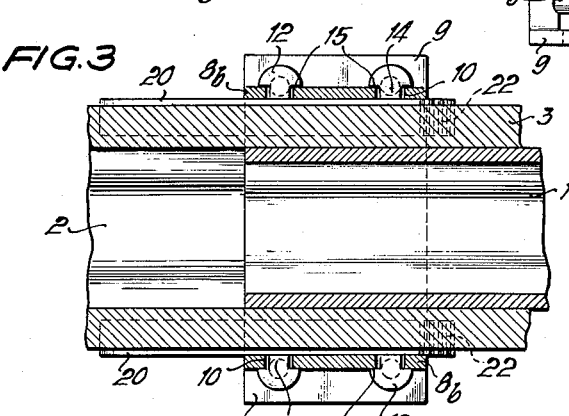
INVENTOR
Hans F. Heintzmann
By
Watson, Cole, Grindle & Watson
Attys.

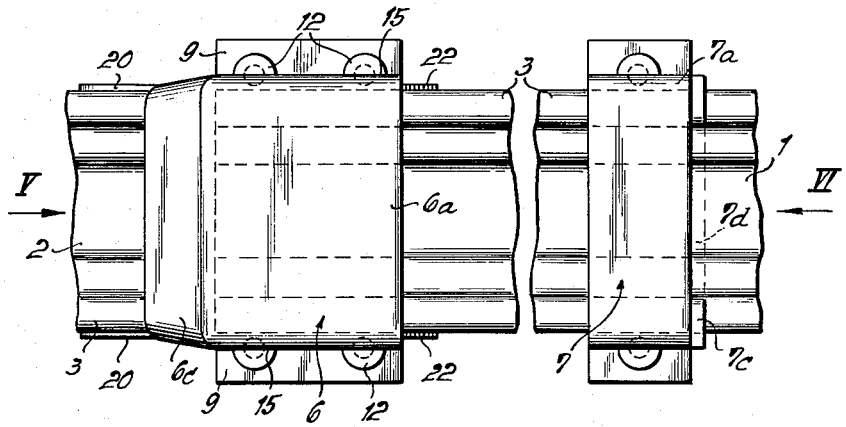
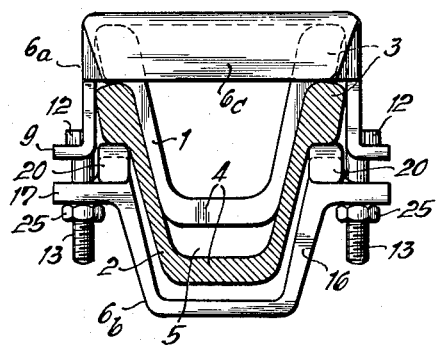
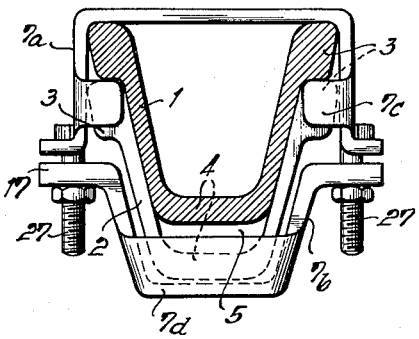
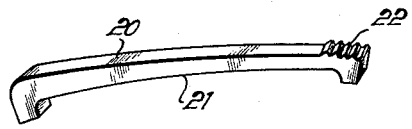

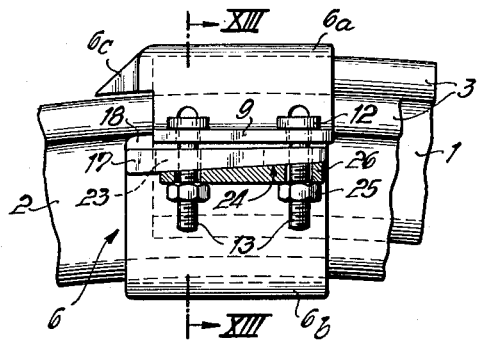
FIG.12
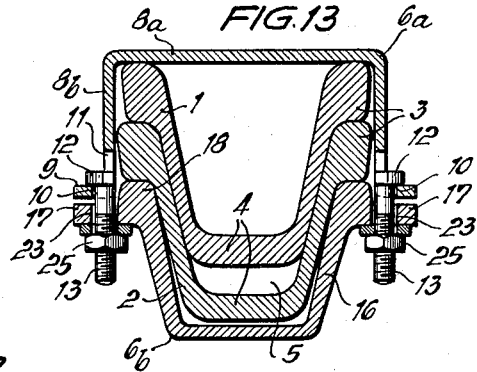
FIG.13
FIG.17 FIG.14 FIG.15
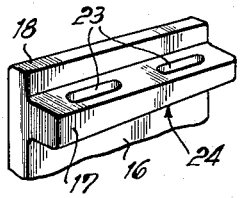 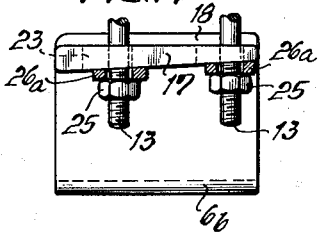 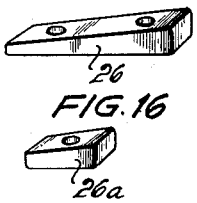
FIG.16
INVENTOR
Hans F. Heintzmann
By
Watson, Cole, Grindle & Watson
Attys.

United States Patent Office 3,004,637
Patented Oct. 17, 1961

3,004,637
YIELDING CONNECTION FOR IDENTICAL FLANGED CHANNEL-LIKE PROFILE MEMBERS IN OVERLAPPING ENGAGEMENT
Hans Friedrich Heintzmann, Bochum, Germany, assignor to Bochumer Eisenhutte Heintzmann & Co., Bochum, Germany
Filed Feb. 27, 1957, Ser. No. 642,692
Claims priority, application Austria Feb. 29, 1956
7 Claims. (Cl. 189—36)

The invention relates to an improved yielding connection for identical flanged channel-like profile members in overlapping engagement and which consists of a tension sleeve of special construction. The present invention is applicable to supporting frames for mine supports and the like as for example disclosed in Patent No. 2,713,774, issued July 26, 1955.

It is an object of the invention to provide connecting means in the form of a pair of U-shaped members one on the upper part and the other on a lower part, and each having side flanges for interconnection with bolts. The structure according to the invention is characterized by the fact that the holes for the bolts is provided in the flanges of the two parts of the connecting means and provided with openings to accommodate the heads of the bolts.

It is a further object of the invention to construct the upper and lower parts of the tension connecting member of sheet metal bent into U-shape and provided with short or narrow flanges with the holes for the retaining bolts provided adjacent or opposite the leg parts of the connecting members. The bolts are thus in line with the extension of the side surfaces or members of the upper part of the connecting or coupling member and directly under the side parts. Thus the force in the bolts will be directed only in one direction and the pull tension of the bolts is practically directly in line with the side elements of the upper part of the coupling. It is thus a further object of the invention to prevent the bending of the flanges of the coupling members. Another object of the invention resides in the fact that it is possible to use bolts having a smaller diameter and the flanges on the lower part of the coupling can be quite narrow and still produce the desired tension in the coupling.

A still further object of the invention resides in the provision of the holes in the flanges in the upper part of the coupling in a location directly under the side members so that the head of each bolt will be held from rotation by direct contact of the head with the flange parts of the profiles, or with the side opening in each side part of the upper part of the coupling. The bolt is thus locked to the coupling parts.

It is preferable to use profile members having similar cross sections and the profile members are made of steel, but it is of course possible to use other metals such as light metal alloys. The channel profiles are of such configuration that they will abut each other by means of their flanges.

It is an object of the invention to use the connecting members for the support profiles of the roofs of tunnels, mines and the like, but they may also be used for bridge building and other structures. It is also possible to utilize the invention as a draw prop. Such props may be used in mines in order to reinforce the sides of the mine shafts and passages.

Further objects will be apparent from the following description when considered in connection with the accompanying drawings in which:

FIGURE 1 is a side elevation of the connecting members in two parts as applied to two overlapping profile elements, FIG. 2 is a cross section taken on line II—II of FIG. 1 in the direction of the arrows, FIG. 3 is a horizontal section taken on line III—III of FIG. 2 in the direction of the arrows, FIG. 4 is a top view of the connecting members of FIG. 1, FIG. 5 is an end view of the overlapping profile elements partly in section as viewed in the direction of the arrow V in FIG. 4, FIG. 6 is an end view of the overlapping profile elements partly in section as viewed in the direction of the arrow VI in FIG. 4, FIG. 7 is a side view of a detail of the upper part of the connecting element, FIG. 8 is a cross section of the detail of FIG. 7.

FIG. 9 is a side view of a detail of the formation of the side opening in the upper part of the connecting element, FIG. 10 is a cross section of the detail of FIG. 9.

FIG. 11 is a perspective view of the detail of a wedge or key member,

FIG. 12 is a side view partly in section of a modified structure of the connecting element for the profile members, FIG. 13 is a cross section of the structure of FIG. 12 taken on line XIII—XIII of FIG. 12 in the direction of the arrows, FIG. 14 is a side view of the lower part of the connecting element of FIG. 12, FIG. 15 is a perspective view of a detail of the intermediate plate for the structure of FIG. 12, FIG. 16 is a perspective view of a detail of the intermediate plate of FIG. 14, and FIG. 17 is a perspective view of a detail of the lower part showing the cam-shaped flange.

In all of the modifications shown on the drawings, the inner profile 1 and the outer profile 2 are identical and are channel-like in cross section, and the latter are therefore congruent. The channel profiles in the overlapping ends are mounted one in the other with the flanges 3 in adjacent contact with each other. Between the bottoms 4 of the channel profiles 1 and 2 there is formed an intermediate space 5. The two channel profiles 1 and 2 in the overlapping portions, are provided and surrounded with a tension sleeve or member 6 and a divided guide ring 7. The tension sleeve 6 consists of a U-shaped upper part 6a and a U-shaped lower part 6b with the upper part 6a and the lower part 6b held together under tension by means of bolts 13. By means of tension sleeves, the two channel profile members are pressed into each other and also the sleeves accomplish the pressing of the two overlapping ends together when a particularly high force is applied on the two profile members causing a small sliding action between the two members.

The upper part of the tension coupling is provided on one of the front sides with a bent-down flap lug 6c. Against the inner side of this lug 6c there abuts the end surface of the inner profile 1 in such a way that upon relative sliding movement of the profiles 1 and 2, the tension coupling will be moved along with the channel profile 1 and will slide on the channel profile 2. On the end of the outer profile 2 there is provided the guide ring 7 and this ring comprises likewise a U-shaped upper part 7a and a U-shaped lower part 7b. Both parts, as in the case of the tension coupling 6, are secured together by bolts. The guide ring 7 prevents the separation of the outer profile 2 from the inner profile 1, and the guide ring has on its side end of the upper part 7a, an abutment 7c directed inwards to lie flat against the flanges 3 of the outer profile 2. The lower part 7b likewise has an abutment 7d on the end side which abuts against the end of the bottom part of the outer profile 2. Upon relative sliding movement of the channel profiles 1 and 2, the guide ring 7 will be carried along by the inner profile 2 to slide therefore on the channel profile 1.

The arrangement of the tension sleeve 6 and the guide ring 7 can be used in a reverse order than as shown in FIG. 1. In such situation the lug 6c must be provided on the lower part 6b of the sleeve 6, so that the outer profile 2 may abut against the inner side of the respective lug 6c. In the guide ring 7 the end abutments 7c must be slightly higher so that the inner profile 1 may abut against the end side of this abutment 7c.

In the modified construction according to FIGS. 1 to 5, the tension sleeve 6 has an upper part 6a and the lower part 6b. The parts 6a and 6b have a so-called U-shaped configuration in cross section. The upper part 6a is suitably made of sheet metal of approximately 3 to 5 mm. in wall thickness and has a straight section 8a in contact with the upper side of the flanges 3 of the inner profile 1. The side parts 8b of the upper part 6a are directly provided adjacent the outer sides of the profile flanges 3 downwardly to approximately the underside of the flanges 3 of the outer profile 2. The ends of the side parts 8b are provided with short flanges 9 bent outwardly. The flanges 9 are provided adjacent each side part, with holes 10 and the cross section of these holes are provided so that they project in part into the extension of the cross section, that is they extend into the side walls 8b. The middle of each hole is provided as far as possible within the range of the wall strength of the side walls 8b. Over each hole 10 there is provided a cut-out portion 11 in the side part 8b and in this cut-out portion the head 12 of the bolt 13 is gripped. The head 12 of the bolt is made as long as possible and the form of the head is such that the latter will spring laterally by means of a lug or shoulder 14 into the cut-out portion 11. Both sides of the portion 11 act as abutments for the head 12 and are provided with side surfaces 15 on the outer sides of the side parts 8b. The bolt head has therefore a rigid grip and therefore cannot turn.

After inserting the bolts, the holes 11 above the bolt heads 12 may be provided either with the means shown in FIGS. 7 and 8 by insert pieces 11a, or by means shown in FIGS. 9 and 10 by pressing a part of the adjacent surface 11b into the hole so that the bolt cannot be removed. The diameter of the bolt is approximately twice as great, or at most smaller than double the wall thickness of the part 6 (for example 10 mm. or less). The upper part 6a consists of a laterally directed part 6c on the side of the upper part directed at an angle and which abuts against the end surface of the inner profile 1.

The lower part 6b may be drop-forged and preferably the lower part is cut from a rolled and flanged channel profile whereby the cross section of this channel profile is suitably chosen and the parts are separated by sawing. Thus it is possible to provide each connecting member with the desired width. The tension lower part 6b is provided with angularly directed sides or parts 16, FIG. 2, terminating in short flanges 17. The extension of each side member 16 merges into a ridge or rib 18 above the flange 17 which abuts against wedge 20 which abuts against the underside of the flanges 3 of the outer profile 2. The ribs 18 are in contact with an elongated flexible metal wedge 20 having a cam surface 21 to contact on the upper surface 19 of each rib 18. The metal wedge 20 contacts directly against the under-surface of the profile flange and the length of the wedge is essentially greater than the width of the tension sleeve. At the smaller end of wedge 20 there are provided rib projections 22 as shown in FIG. 11.

The holes 23 provided in the flanges 17 are exactly under the holes 10 of the flanges 9 of the upper parts 6a. Between the flanges 9 and 17 a small space is provided but apart from this the ridge or rib 18 is maintained so small that the flange 9 may be pulled toward the flange 17. The rib 18 may abut with its upper surface against the outer side of the flange of the outer profile 2 as shown in FIG. 13. By the use of the metal wedge 20, the inner sides of the metal wedge may abut against the outer sides of the flanges of the outer profile 2.

Upon the relative movement of the profiles 1 and 2, the entire sleeve 6 of the profile 1 will slide on the profile 2. The thin wedge 20 will thus sink deeper into the connecting parts. Due to the geometric formation of the wedge 20, which is slightly bent and less curved than the curved upper surface of the rib 18, there will result a bending of the projections 22 carrying the thin wedge ends only when the tension lower part is forced against the thick end of the wedge. At this point there results the greatest tension force. Each wedge 20 contacts on the outer elongated side with the inner sides of the flanges 9 and on the bolts 13, which to a certain degree limit the extent of movement for the wedge. The width of the wedges is approximately the same as the width of the underside of the profile flanges 3. The flanges 17 of the tension lower part are relatively flexible at the roots, that is at the connection with the side parts 16 and the rib 18. Due to the particular position of the bolts 13 there is attained a comparative shorter tendency for bending of the lever arm since in the structure the flanges are maintained shorter than in structures which were used heretofore.

In the modification according to FIGS. 12 and 13, the sleeve is likewise divided by the upper part 6a and a lower part 6b and provided with flanges 9 and 17 which are connected by means of bolts 13. The interconnection takes place in a manner similar to the modification according to FIGS. 1 to 5. In the modification according to FIGS. 12 and 13, the lower part 6b is provided with ribs 18 directly in contact against the underside of the flanges 3 of the outer profile 2. The holes 23 in the flanges 17 are formed as elongated eyes (see FIGS. 12, 14 and 17). The lower side of the flanges 17 are provided with slanting surfaces in the longitudinal direction, so that the cam or wedge surface 24 will be formed. Between the nuts 25 and each wedge surface 24, there is an elongated wedge-shaped intermediate element 26 provided by means of which the bolts 13 will extend therethrough. The intermediate element 26 is coupled by bolts 13 with the upper part 6a of the sleeve so that finally the lower part 6b may slide with the wedge-shaped flange 17 due to the elongated holes 23. The wedge-shaped form of the flanges 17 will function thus to strengthen the tension in the connecting members.

FIG. 14 shows a modified structure according to FIG. 12. Here there is an intermediate plate 26a, FIG. 16, formed as a wedge instead of the wedge-shaped intermediate element 26.

In the modified structure according to FIGS. 12 to 14, the two parts 6a and 6b of the sleeve 6 are so mounted together with the profiles 1 and 2 as to cause a relative movement thereby. Thus the longitudinally directed flanges 17 may be formed wedge-shaped at right angles to the screw bolts 13 on the wedge surfaces between the intermediate element 26 and the disc or plate 26a to an extent until the end surface of the elongated eye 23 will abut against the bolts.

From FIG. 1 it is noted that the guide ring 7 has the structure similar to the tension sleeve 6. The guide ring 7 has, however, approximately one half the width of the tension sleeve 6 and is held together on each side by only one bolt 27. These bolts 27 are mounted in the upper and lower parts of the guide ring in exactly the same way as in the tension sleeve 6. Also the upper part of the guide ring is made of a thin bent sheet metal which on the sides is provided with cut-out portions to accommodate a part of the heads of the bolts 27. The guide ring 7 is not provided with wedges and these are not necessary to prevent a relative movement between the upper and lower parts. The bolts 27 are exactly the same size as the bolts 13 for the tension sleeve 6. The bolts 27 can therefore be secured or removed by means of the same wrench or tool as is required for the bolts 13.

I claim:

1. A coupling for the overlapping ends of frame members particularly for supporting mine passages and composed of interfitting inner and outer U-shaped frame members with out-turned flanges disposed along the free edges of the U, comprising a U-shaped upper part, a U-shaped lower part, said parts each having laterally extending flanges with at least one hole in the flange of the upper part being partly in the flange and partly in a side section thereof thereby forming a hole which is substantially right-angled, said lower part having at least one hole therein in correspondence with and in registry with the hole in the upper part, a ridge provided adjacent the flange of the lower part projecting against one of the frame members, and a bolt provided in the registered holes of the laterally extending flanges of the upper and lower parts and having a widened head with side walls to contact against the outer side surface of the upper part and a lug which extends partly into the hole which is in the upper part and through the hole in the flange of the upper part, the abutting of the bolt head against the upper part preventing the turning of the bolt.

2. A coupling according to claim 1, in which an insert member is provided in the part of the hole provided in the side surface and immediately above the bolt head.

3. A coupling according to claim 1, in which a wedge member is provided operatively connected to the bolt and abutting against the under side of the lower extending flange.

4. A coupling according to claim 1, in which there are two holes in each laterally extending flange with a bolt for each pair of superposed holes, and in which the holes of the laterally extending flange of the lower part are each elongated in the longitudinal direction of the flange and a wedge member provided for the bolts under the laterally extending flange of the lower part to permit relative movement of the upper and lower parts.

5. A coupling according to claim 1, in which the ridge has a surface forming a wedge surface to contact the flange of one of the flanged frame members and the hole in the lower part is elongated to adjust the bolt in the hole of the lower part with the wedge surface on the part of the flange to abut against a nut for the bolt.

6. A coupling according to claim 1, in which the flanges of the upper and lower parts are provided with two holes with the two holes in the flange of the lower part each elongated, and in which a wedge member is provided in contact with the flange of the lower part and against which a nut for each bolt abuts.

7. A coupling according to claim 1, in which the flanges of the upper and lower parts are provided with two holes with the two holes in the flange of the lower part each elongated, and in which a wedge member is provided in contact with the flange of the lower part and against which a nut for each bolt abuts, said lower part being slidable relative to the upper part in a longitudinal direction of the frame members.

References Cited in the file of this patent

UNITED STATES PATENTS

| | | |
|---|---|---|
| 394,462 | Cook | Dec. 11, 1888 |
| 978,655 | Sauerbeck | Dec. 13, 1910 |
| 1,836,949 | Balough | Dec. 15, 1931 |
| 2,040,374 | Grimes | May 12, 1936 |
| 2,649,126 | Tinnerman | Aug. 18, 1953 |
| 2,867,303 | Weinert et al. | Jan. 6, 1959 |

FOREIGN PATENTS

| | | |
|---|---|---|
| 471,104 | Italy | May 6, 1952 |
| 895,749 | France | Apr. 11, 1944 |
| 725,305 | Great Britain | Mar. 2, 1955 |